United States Patent
Muraoka et al.

(10) Patent No.: US 8,673,498 B2
(45) Date of Patent: Mar. 18, 2014

(54) NONAQUEOUS ELECTROLYTE SECONDARY BATTERY

(75) Inventors: Yoshiyuki Muraoka, Osaka (JP); Hajime Nishino, Nara (JP); Yukihiro Okada, Osaka (JP); Mikinari Shimada, Osaka (JP); Miyuki Nakai, Osaka (JP)

(73) Assignee: Panasonic Corporation, Osaka (JP)

( * ) Notice: Subject to any disclaimer, the term of this patent is extended or adjusted under 35 U.S.C. 154(b) by 315 days.

(21) Appl. No.: 12/518,803

(22) PCT Filed: Dec. 13, 2007

(86) PCT No.: PCT/JP2007/074034
§ 371 (c)(1),
(2), (4) Date: Jun. 11, 2009

(87) PCT Pub. No.: WO2008/087814
PCT Pub. Date: Jul. 24, 2008

(65) Prior Publication Data
US 2010/0136429 A1    Jun. 3, 2010

(30) Foreign Application Priority Data
Jan. 16, 2007  (JP) ................. 2007-006648

(51) Int. Cl.
*H01M 4/00* (2006.01)
*H01M 2/16* (2006.01)

(52) U.S. Cl.
USPC .......................................... 429/223; 429/426

(58) Field of Classification Search
USPC .............................................. 429/223, 246
See application file for complete search history.

(56) References Cited

U.S. PATENT DOCUMENTS

| | | | | |
|---|---|---|---|---|
| 6,051,341 A | * | 4/2000 | Terasaki | 429/234 |
| 7,736,800 B2 | * | 6/2010 | Lee | 429/181 |
| 2004/0253518 A1 | | 12/2004 | Hosoya et al. | |
| 2007/0141469 A1 | * | 6/2007 | Tokunaga et al. | 429/231.3 |

FOREIGN PATENT DOCUMENTS

| | | | |
|---|---|---|---|
| JP | 4-355057 | | 12/1992 |
| JP | 9-102301 | | 4/1997 |
| JP | 10-050294 | | 2/1998 |
| JP | 10-199574 A | | 7/1998 |
| JP | 11-007958 | | 1/1999 |
| JP | 2000-164206 | | 6/2000 |
| JP | 3223523 | | 8/2001 |
| JP | 2001-273897 | | 10/2001 |
| JP | 2001-297763 | | 10/2001 |
| JP | 2001297763 A | * | 10/2001 |
| JP | 2006-079932 A | | 3/2006 |
| JP | 3765094 B2 | | 4/2006 |
| JP | 2006-351386 | | 12/2006 |

* cited by examiner

*Primary Examiner* — Karie Apicella
(74) *Attorney, Agent, or Firm* — McDermott Will & Emery LLP (57) ABSTRACT

A nonaqueous electrolyte secondary battery includes a positive electrode (5), a negative electrode (6) and a porous insulation layer (7). The positive electrode (5) includes a positive electrode current collector (51) and a positive electrode mixture layer (52), and the negative electrode (6) includes a negative electrode current collector (61) and a negative electrode active material layer (62). After charging the nonaqueous electrolyte secondary battery, when a surface of the positive electrode mixture layer (52) and a surface of the negative electrode active material layer (62) are brought in contact with each other, terminals are provided, respectively, on the positive electrode current collector (51) and the negative electrode current collector (62) and a resistance value between the terminals is measured, the resistance value is 1.6 Ω·cm² or more.

4 Claims, 3 Drawing Sheets

NONAQUEOUS ELECTROLYTE SECONDARY BATTERY

This application is the U.S. National Phase under 35 U.S.C. §371 of International Application No. PCT/JP2007/074034, filed on Dec. 13, 2007, which in turn claims the benefit of Japanese Application No. 2007-006648, filed on Jan. 16, 2007, the disclosures of which Applications are incorporated by reference herein.

TECHNICAL FIELD

The present disclosure relates to a nonaqueous electrolyte secondary battery such as a lithium ion secondary battery and the like, and more particularly relates to safety technique used in the nonaqueous electrolyte secondary battery.

BACKGROUND ART

In recent years, there have been demands for clean energy in view of environmental issues, and also demands for use of DC power sources as vehicle mounted power sources, power sources for large-size tools and the like. To satisfy such demands, a small-size and light-weight secondary battery which can be charged quickly and also can discharge a high current is required. Examples of typical secondary batteries satisfying such demands include a nonaqueous electrolyte secondary battery. In general, in a nonaqueous electrolyte secondary battery, as a negative electrode material, an active material such as, specifically, lithium metal, lithium alloy or the like is used, or a material in which lithium intercalation compound is inserted in carbon as a host material (which is, herein, a material capable of inserting/extracting lithium ions) is used. As an electrolyte, an aprotic organic solvent in which lithium salt such as $LiClO_4$, $LiPF_6$ or the like is dissolved is used.

Specifically, the nonaqueous electrolyte secondary battery includes a negative electrode plate, a positive electrode plate, and a separator. In the negative electrode plate, the negative electrode material is held in a negative electrode current collector, and in the positive electrode, a positive electrode active material (for example, lithium cobalt composite oxide) which electrochemically reacts reversibly with lithium ions is held in a positive electrode current collector. The separator contains an electrolyte, and is interposed between the negative electrode plate and the positive electrode plate to prevent the occurrence of a short-circuit between the negative electrode plate and the positive electrode plate.

As a method for producing such a nonaqueous electrolyte secondary battery, first, each of a positive electrode plate and a negative electrode plate is formed into a thin film sheet or a foil form, and the positive electrode plate and the negative electrode plate are stacked or spirally wound with a separator interposed therebetween, thereby forming an electricity generating element. Next, the electricity generating element is placed in a battery case made of stainless steel, iron plated with nickel, or some other metal such as aluminum or the like, and a nonaqueous electrolyte is injected into the battery case. Thereafter, a lid plate is firmly fixed to the battery case to closely seal the battery case. Thus, a nonaqueous electrolyte secondary battery is assembled.

In general, when a lithium ion secondary battery is overcharged, or an internal short-circuit occurs in a lithium ion secondary battery, heat is generated in the lithium ion secondary battery and a temperature of the lithium ion secondary battery is increased to high temperature. There may be a risk of excessive heating when the lithium ion secondary battery is under high temperature, and it is therefore desired to improve the safety of the battery. Specifically, since in a large size, high output lithium ion secondary battery, excessive heating occurs with increased probability, efforts to improve the safety of the battery, for example, efforts to reduce a possibility of occurrence of excessive heating, and the like, have to be made.

A major cause of excessive heating occurring when a lithium ion secondary battery is left under high temperature is that a positive electrode active material is unstable in a charged state and under high temperature. That is, when a lithium ion secondary battery is in a charged state and under high temperature, oxygen is eliminated from the positive electrode active material (in general, lithium composite oxide) and the eliminated active oxygen reacts with an electrolyte and the like. Due to this reaction, reaction heat is generated, and thus, the temperature of the positive electrode active material is further increased. When the temperature of the positive electrode active material is further increased, further elimination of oxygen from the positive electrode active material is induced, so that reaction of the active oxygen with the electrolyte and the like is more easily caused and reaction heat is easily generated. In this manner, when the temperature of the positive electrode active material is increased to high temperature, active oxygen reacts with the electrolyte and the like and reaction heat is easily generated, and when reaction heat is generated, the temperature of the positive electrode active material is further increased to higher temperature. It is believed that such chain-reaction heat generation causes excessive heating of the lithium ion secondary battery.

The following is a possible reason for the temperature of the lithium ion secondary battery to be increased to high temperature. When a battery becomes in an abnormal state at a time of overcharge or due to the generation of an internal short-circuit and the like, a separator made of polyethylene is melted or contracted, thus causing a short-circuit of a positive electrode and a negative electrode. Due to this short-circuit, a high current flows and, as a result, the temperature is rapidly increased. Upon rapid increase in temperature, excessive heating of the lithium ion secondary battery occurs in the above-described manner.

As means for improving the safety of a lithium ion secondary battery, a method in which heat stability of a positive electrode active material is improved has been proposed. Specifically, part of Co of lithium cobaltate as the positive electrode active material is replaced with some other element such as Al, thereby improving heat stability of lithium cobaltate (Patent Document 1).

As another means for improving heat stability of a lithium ion secondary battery, a method in which an electrical resistance of an active material is increased to suppress the generation of heat of the battery at a time of a short-circuit has been proposed. Specifically, lithium cobalt composite oxide having a resistance coefficient of 1 mΩ·cm or more and 40 mΩ·cm or less when its powder filling density is 3.8 g/cm³ is used as a positive electrode active material, thereby suppressing the generation of heat of the battery at a time of a short-circuit (Patent Document 2).

As still another means for improving heat stability of a lithium ion secondary battery, a method in which a resistive layer having a higher resistance than a resistance of a current collector is provided on a surface of the current collector has been proposed. Specifically, a resistive layer having a resistance value of 0.1 to 100 Ω·cm² is provided, thereby preventing a flow of high current even when an internal short-circuit occurs (Patent Document 3).

Patent Document 1: Japanese Published Application No. H11-7958
Patent Document 2: Japanese Published Application No. 2001-297763
Patent Document 3: Japanese Published Application No. H10-199574

DISCLOSURE OF THE INVENTION

Problems which the Invention is to Solve

However, in the technique proposed in Patent Document 1, when part of Co of lithium cobaltate is replaced with some other element such as Al, an output property of the lithium ion secondary battery might be deteriorated. Similarly, as in the technique proposed in Patent Document 3, when a resistive layer is provided on a surface of a current collector, a current collection rate might be reduced, thus resulting in deterioration of an output property of the lithium ion secondary battery.

Also, in the technique proposed in Patent Document 2, even with the positive electrode active material having a high resistance provided, when an electrode plate has a reduced thickness, or when a large amount of a conductive agent is contained in a mixture layer, a current flowing at a time when an internal short-circuit occurs is increased, and it becomes difficult to suppress increase in amount of heat generated at a time of an internal short-circuit.

In view of the above, it is therefore an object of the present invention to solve the above-described problems, and provide a highly safe nonaqueous electrolyte secondary battery which allows prevention of excessive heating of the battery, without causing deterioration of an output property of the battery, even when the battery becomes in an abnormal state at a time of overcharge or due to the generation of an internal short-circuit and the like.

Solution to the Problems

A nonaqueous electrolyte secondary battery according to the disclosure of the present invention includes: a positive electrode including a conductive positive electrode current collector and a positive electrode mixture layer provided on a surface of the positive electrode current collector and containing a positive electrode active material being capable of electrochemically inserting and extracting lithium ions; a negative electrode including a conductive negative electrode current collector and a negative electrode active material layer provided on a surface of the negative electrode current collector and containing a negative electrode active material being capable of electrochemically inserting and extracting lithium ions; a porous insulation layer interposed between the positive electrode and the negative electrode; and a nonaqueous electrolyte held between the positive electrode and the negative electrode. After charging, when the porous insulation layer is removed and thereby a surface of the positive electrode mixture layer and a surface of the negative electrode active material layer are brought in contact with each other, terminals are provided, respectively, on the positive electrode current collector and the negative electrode current collector and a resistance value between the terminals is measured, the resistance value is 1.6 $\Omega \cdot cm^2$ or more.

In the above-described configuration, even when the porous insulation layer has disappeared as a result of the battery being in an abnormal state, the resistance between the positive electrode and the negative electrode is large, and thus a flow of high current between the positive electrode and the negative electrode can be suppressed.

In the inventive nonaqueous electrolyte secondary battery, it is preferable that the resistance value is 5 $\Omega \cdot cm^2$ or more and 10 $\Omega \cdot cm^2$ or less.

In a preferred embodiment described below, insulating members are scattered at least one of an interface between the positive electrode current collector and the positive electrode mixture layer and an interface between the negative electrode current collector and the negative electrode active material layer. Also, in the preferred embodiment described below, 5 wt % or more of lithium composite oxide containing Co, Ni and some other element M than Co and Ni is contained as the positive electrode active material in the positive electrode mixture layer, and the element M is at least one of Na, Mg, Sc, Y, Mn, Fe, Cu, Zn, Al, Cr, Pb, Sb and B. Furthermore, in the preferred embodiment described below, it is preferable that the insulating members are of at least one of a particulate member having a particle size of 0.1 μm or more and 10 μm or less, a chain member formed of multiple ones of the particulate member arranged in chains, and a fibrous member, and the insulating members are metal oxide.

Effects of the Invention

According to the disclosure of the present invention, a nonaqueous electrolyte secondary battery having excellent safety property and discharge property can be provided.

EXPLANATION OF REFERENCE CHARACTERS

1 Battery case
2 Sealing plate
3 Gasket
5 Positive electrode
5a Positive electrode lead
6 Negative electrode
6a Negative electrode lead
7 Porous insulation layer
8a Upper insulation plate
8b Lower insulation plate
9 Electrode group
10 Insulating members
11 Positive electrode active materials
51 Positive electrode current collector
52 Positive electrode mixture layer 61 Negative electrode current collector
62 Negative electrode active material layer

BEST MODE FOR CARRYING OUT THE
INVENTION

Hereinafter, an embodiment of the present invention will be described in detail with reference to the accompanying drawings. Note that the present invention is not limited to the following embodiments.

In the embodiment of the present invention, a lithium ion secondary battery as a nonaqueous electrolyte secondary battery will be described as an example, and a configuration thereof will be illustrated.

Figure 1:
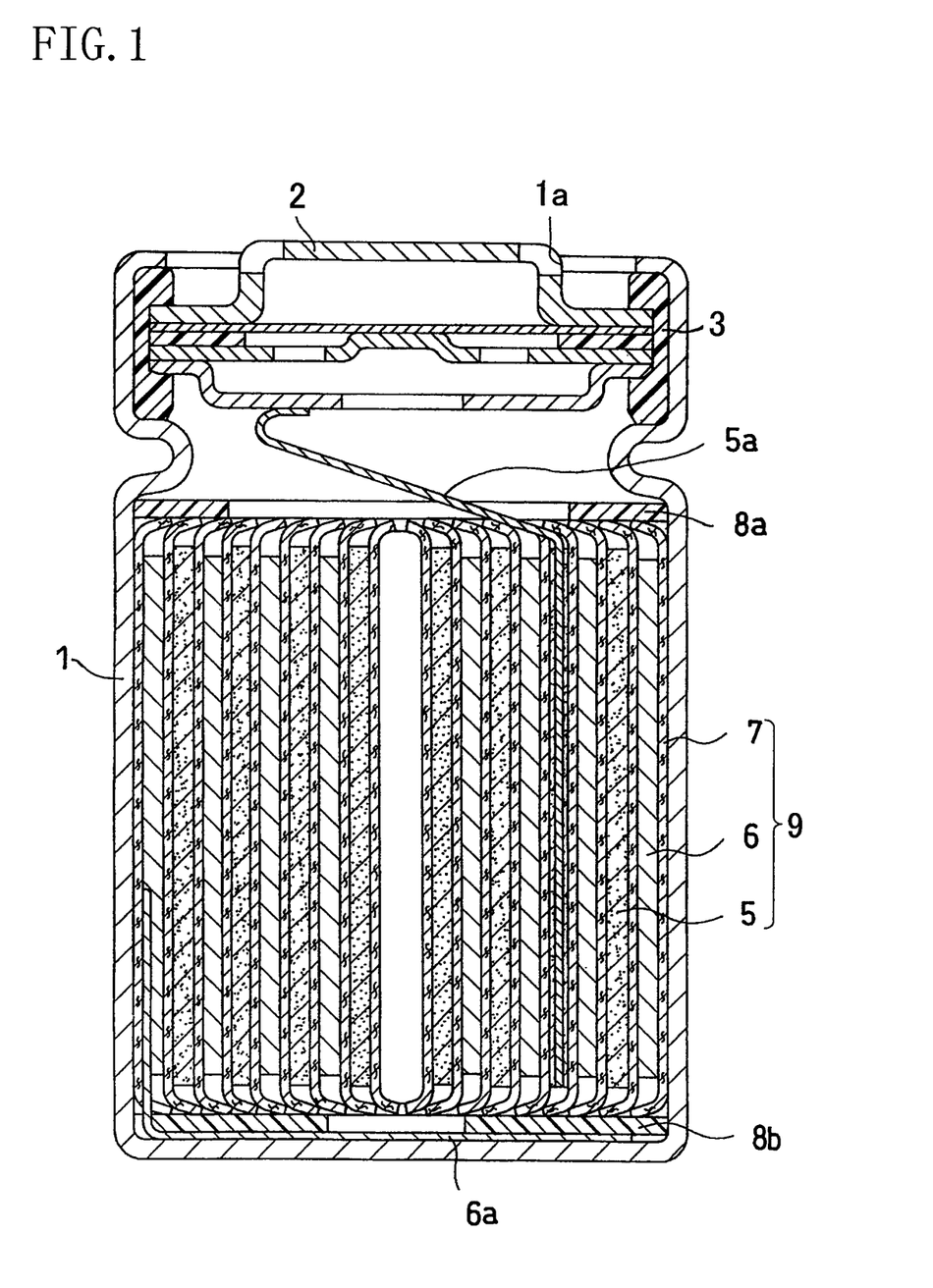
FIG. 1 is a longitudinal sectional view illustrating a configuration of a lithium ion secondary battery according to an embodiment of the present invention.
Figure 2:
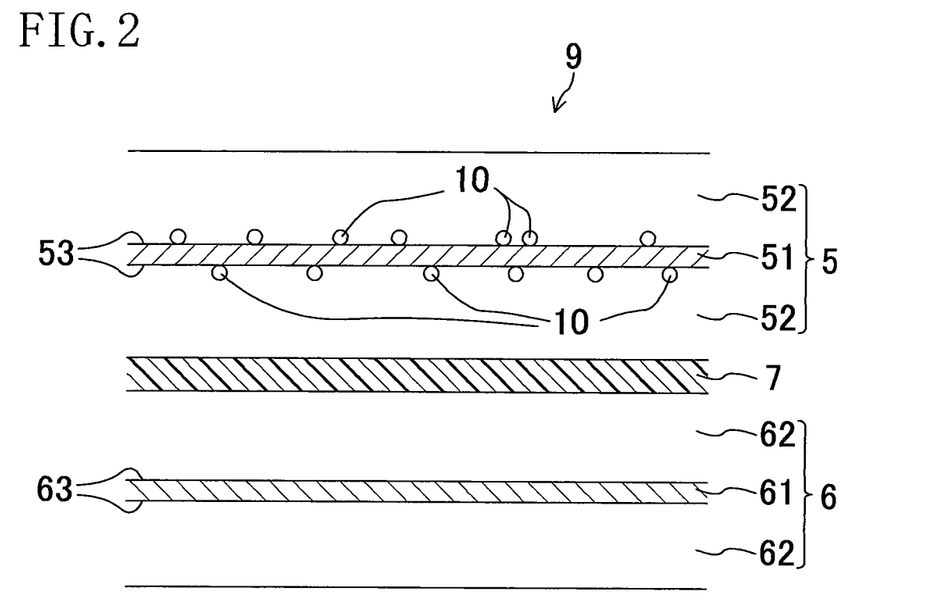
FIG. 2 is a cross-sectional view illustrating a configuration of an electrode group according to an embodiment of the present invention.

FIG. 1 is a longitudinal sectional view illustrating a configuration of a lithium ion secondary battery according to this embodiment. FIG. 2 is an enlarged view illustrating a configuration of an electrode group 9 included in the lithium ion secondary battery of this embodiment.

As shown in FIG. 1, the lithium ion secondary battery of this embodiment includes a battery case 1 made of, for example, stainless steel and an electrode group 9 placed in the battery case 1.

The battery case 1 has an opening 1a formed in an upper surface thereof. At the opening 1a, a sealing plate 2 is crimped to the battery case 1 with a gasket 3 interposed therebetween, thereby sealing the opening 1a.

The electrode group 9 includes a positive electrode 5, a negative electrode 6 and a porous insulation layer 7 made of, for example, polyethylene, and the positive electrode 5 and the negative electrode 6 are spirally wound with the porous insulation layer 7 interposed therebetween. Note that a nonaqueous electrolyte (not shown) is held between the positive electrode 5 and the negative electrode 6. An upper insulation plate 8a is arranged over the electrode group 9, and a lower insulation plate 8b is arranged under the electrode group 9.

One end of a positive electrode lead 5a made of aluminum is attached to the positive electrode 5, and the other end of the positive electrode lead 5a is connected to the sealing plate 2 serving also as a positive electrode terminal. One end of a negative electrode lead 6a made of nickel is attached to the negative electrode 6, and the other end of the negative electrode lead 6a is connected to the battery case 1 serving also as a negative electrode terminal.

As shown in FIG. 2, the positive electrode 5 includes a positive electrode current collector 51 and a positive electrode mixture layer 52. The positive electrode current collector 51 is a conductive plate-like member. The positive electrode mixture layer 52 is provided on both surfaces of the positive electrode current collector 51 and includes a positive electrode active material (for example, lithium composite oxide, not shown in FIG. 2). The positive electrode mixture layer 52 preferably includes, in addition to the positive electrode active material, a binder, a conductive agent and the like. The negative electrode 6 includes a negative electrode current collector 61 and a negative electrode active material layer 62. The negative electrode current collector 61 is a conductive plate-like member. The negative electrode active material layer 62 is provided on both surfaces of the negative electrode current collector 61 and includes a negative electrode active material (not shown). The negative electrode active material layer 62 preferably includes, in addition to the negative electrode active material, a binder and the like. A resistance between the positive electrode 5 and the negative electrode 6 is 1.6 $\Omega \cdot cm^2$ or more. As in this embodiment, with the resistance being 1.6 $\Omega \cdot cm^2$ or more, even when the porous insulation layer 7 is melted or contracted and disappears at a time of overcharge or due to the occurrence of an internal short-circuit, a flow of a large amount of current between the positive electrode 5 and the negative electrode 6 can be prevented. Thus, the generation of heat in the lithium ion secondary battery can be suppressed. As a result, the safety of the lithium ion secondary battery can be improved.

In this specification, the resistance between the positive electrode 5 and the negative electrode 6 means a resistance measured according to the following method. As the measuring method, the lithium ion secondary battery is first charged, and next the porous insulation layer 7 is removed so that a surface of the positive electrode mixture layer 52 and a surface of the negative electrode active material layer 62 are brought in contact with each other. Thereafter, a positive electrode terminal and a negative electrode terminal are attached to the positive electrode current collector 51 and the negative electrode current collector 61, respectively, and a direct current resistance value between the positive electrode terminal and the negative electrode terminal is measured. To ensure contact of the surface of the positive electrode mixture layer 52 and the surface of the negative electrode active material layer 62, it is preferable to apply a pressure (for example, $9.8 \times 10^4$ N/m$^2$ or more and $9.8 \times 10^5$ N/m$^2$ or less) to the positive electrode 5 and the negative electrode 6. Moreover, as a method for measuring the direct current resistance value between the positive electrode terminal and the negative electrode terminal, for example, a four terminal method can be used.

The resistance between the positive electrode 5 and the negative electrode 6 includes a resistance of an interface 53 between the positive electrode current collector 51 and the positive electrode mixture layer 52, an electronic resistance of the positive electrode mixture layer 52, a contact resistance due to contact of the positive electrode mixture layer 52 and the negative electrode active material layer 62 with each other, an electronic resistance of the negative electrode active material layer 62, a resistance of an interface 63 between the negative electrode current collector 61 and the negative electrode active material layer 62, and the like. As long as the resistance between the positive electrode 5 and the negative electrode 6 is 1.6 $\Omega \cdot cm^2$ or more, the detail breakdown is not particularly limited.

When the resistance value between the positive electrode 5 and the negative electrode 6 is too small, there might be cases where a flow of a large amount of current between the positive electrode 5 and the negative electrode 6 can not be prevented when the porous insulation layer 7 has disappeared, and thus, it is not very preferable that the resistance value is too small. In contrast, when the resistance value is too large, performance (charge performance, a battery capacity, an energy density or the like) of the lithium ion secondary battery might be degraded, and thus, it is not preferable that the resistance value is too large. In other words, to ensure the performance of the lithium ion secondary battery, the resistance value between the positive electrode 5 and the negative electrode 6 is preferably small, but to prevent a flow of a large amount of current between the positive electrode 5 and the negative electrode 6 when the battery is in an abnormal state, the resistance value is preferably large. In view of the above-described point, the present inventors examined the resistance value and, as a result, found that, when the resistance value between the positive electrode 5 and the negative electrode 6 is 1.6 $\Omega \cdot cm^2$ or more, preferably 1.6 $\Omega \cdot cm^2$ or more and 30 $\Omega \cdot cm^2$ or less, and more preferably 5 $\Omega \cdot cm^2$ or more and 10 $\Omega \cdot cm^2$ or less, the safety of the lithium ion secondary battery was improved without degrading its performance.

Figure 3:
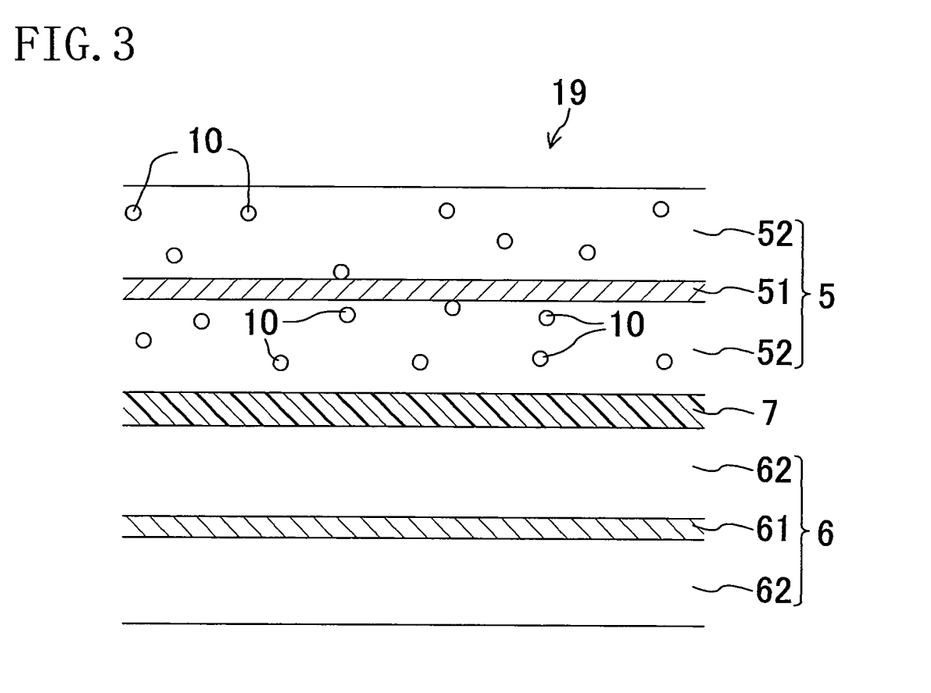
FIG. 3 is a cross-sectional view illustrating a configuration of an electrode group of a comparative example given for comparison purpose in an embodiment of the present invention.

To achieve a resistance value of 1.6 Ω·cm² or more for the resistance between the positive electrode 5 and the negative electrode 6, according to this embodiment, insulating members 10 are scattered at the interface 53 between the positive electrode current collector 51 and the positive electrode mixture layer 52 and the interface 63 between the negative electrode current collector 61 and the negative electrode active material layer 62. The present inventors examined a method for achieving a resistance value of 1.6 Ω·cm² or more for the resistance between the positive electrode 5 and the negative electrode 6 in which the insulating members 10 were mixed in the positive electrode mixture layer 52 and the negative electrode active material layer 62, but reached the conclusion that it was preferable that the insulating members 10 were scattered at the interfaces 53 and 63, not in the positive electrode mixture layer 52 and the negative electrode active material layer 62 for the following reason. The reason for this will be described with reference to FIGS. 2 and 3. FIG. 3 is a cross-sectional view illustrating a configuration of an electrode group 19 of a comparative example given for comparison to this embodiment. Note that in FIG. 2, illustration of the insulating members scattered at the interface 63 is omitted, and in FIG. 3, illustration of the insulating members mixed in the negative electrode active material layer 62 is omitted.

In the lithium ion secondary battery, lithium ions move toward the positive electrode current collector 51 in the positive electrode mixture layer 52 during charging. In the case of FIG. 2, since the insulating members 10 are scattered only at the interface 53 between the positive electrode current collector 51 and the positive electrode mixture layer 52, the resistance of the positive electrode 5 can be locally increased. Therefore, the resistance of the positive electrode 5 can be increased using only a small amount of insulating members 10, and thus, the resistance of the positive electrode 5 can be increased without reducing the amount of the positive electrode active material. On the other hand, in the case of FIG. 3, since the insulating members 10 are mixed in the positive electrode mixture layer 52, the insulating members have to be provided between every adjacent positive electrode active materials in order to reduce conductivity between the positive electrode active materials. Therefore, to achieve a resistance value of 1.6 Ω·cm² or more for the resistance between the positive electrode and the negative electrode, a large amount of the insulating members 10 have to be added. Based on the above, it is presumed that in the case of FIG. 3, a resistance value of 1.6 Ω·cm² or more can not be achieved for the resistance between the positive electrode 5 and the negative electrode 6 unless a larger amount of the insulating members 10 than that in the case of FIG. 2 is added. In other words, when approximately the same amount of insulating members 10 is added in the cases of FIG. 2 and the FIG. 3, there might be cases where the resistance value between the positive electrode and the negative electrode can be made to be 1.6 Ω·cm² or more in the case of FIG. 2 but not in the case of FIG. 3. Furthermore, even when the resistance value is made to be 1.6 Ω·cm² or more as a result of adding a large amount of the insulating members 10 being added, the amount of the positive electrode active material in the positive electrode mixture layer 52 is reduced, and therefore, there are still concerns about reduction in battery capacity.

By the same token, even without a large amount of insulating members added, the resistance between the positive electrode and the negative electrode can be made to be 1.6 Ω·cm² or more in the case where the insulating members 10 exist at the interface 63 between the negative electrode current collector 61 and the negative electrode active material layer 62, compared to the case where the insulating members 10 are mixed in the negative electrode active material layer 62.

Based on the above, it is shown that with the insulating members 10 mixed in the positive electrode mixture layer 52 and the negative electrode active material layer 62, when the resistance value between the positive electrode 5 and the negative electrode 6 is 1.6 Ω·cm² or more, a flow of high current between the positive electrode 5 and the negative electrode 6 can be suppressed even though the positive electrode 5 and the negative electrode 6 are in contact with each other, but a capacity of a battery is reduced. On the other hand, with the insulating members 10 scattered at the interface 53 and the interface 63, when the resistance value of the positive electrode 5 and the negative electrode 6 is 1.6 Ω·cm² or more, a flow of high current between the positive electrode 5 and the negative electrode 6 can be suppressed without causing degradation of the battery performance.

Figure 4:
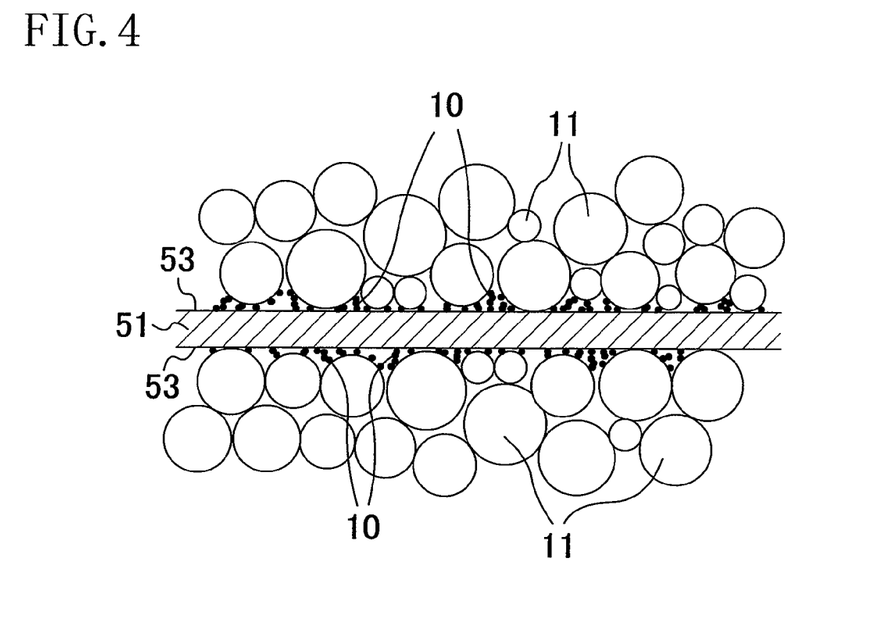
FIG. 4 is an enlarged cross-sectional view illustrating a configuration of an electrode group according to an embodiment of the present invention.

The present inventors formed an electrode group 9 of FIG. 2 and an electrode group 19 of FIG. 3, and observed respective cross sections of the electrode groups. FIG. 4 illustrates the observed cross section of the electrode group 9 of FIG. 2, and FIG. 5 illustrates the observed cross section of the electrode group 19 of FIG. 3.

Observing the cross section of the electrode group 9 of this embodiment, as shown in FIG. 4, some of the insulating members 10 exist between the positive electrode current collector 51 and positive electrode active materials 11, others of the insulating members 10 are scattered on surfaces of the positive electrode active materials 11, and still others of the insulating members 10 are located adjacent to one another. In this specification, "the insulating members 10 are scattered at the interface 53 between the positive electrode current collector 51 and the positive electrode mixture layer 52, and the interface 63 between the negative electrode current collector 61 and the negative electrode active material layer 62" includes not only the case where the insulating members 10 are scattered only at the interface 53 and the interface 63 but also the case where, as shown in FIG. 4, some of the insulating members 10 are located on surfaces of the positive electrode active materials 11 or surfaces of negative electrode active materials (not shown) and the case where the insulating members 10 are located adjacent to one another.

Figure 5:
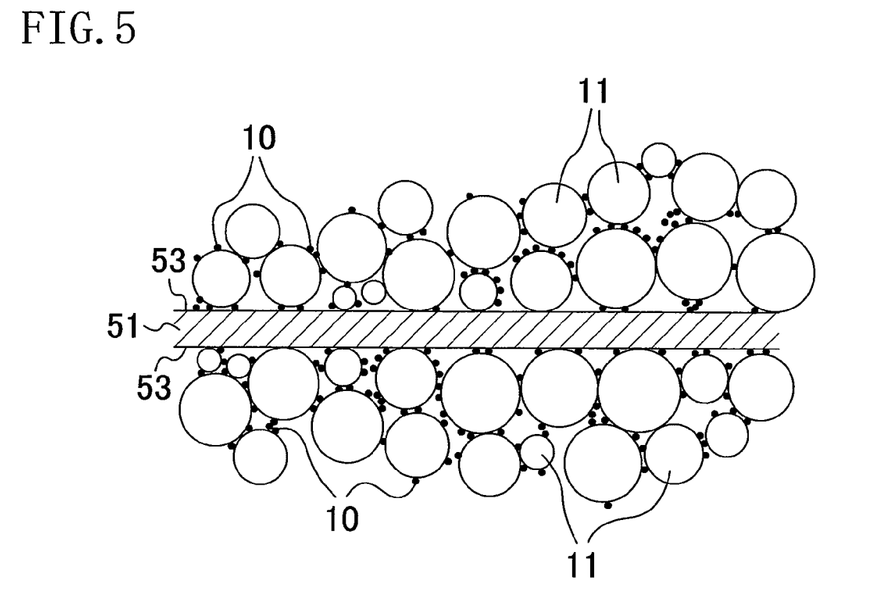
FIG. 5 is an enlarged cross-sectional view illustrating a configuration of an electrode group of a comparative example in an embodiment of the present invention.

Similarly, observing the cross section of the electrode group 19 of FIG. 3, as shown in FIG. 5, some of the insulating members 10 exist between the positive electrode current collector 51 and the positive electrode active materials 11, but many of the insulating members 10 are scattered between adjacent positive electrode active materials 11.

The present inventors believe that the reason why the resistance value between the positive electrode 5 and the negative electrode 6 is increased when the insulating members 10 are scattered at the interface 53 and the interface 63 is that an area of part of the positive electrode mixture layer 52 which is in contact with the positive electrode current collector 51 and an area of part of the negative electrode active material layer 62 which is in contact with the negative electrode current collector 61 are reduced by scattering the insulating members 10 at the interfaces. Since the amount of the insulating members 10 varies depending on a thickness of a current collector, an amount of a conductive agent contained in a mixture layer, a specific surface area, and a resistance value of a material used as an active material, the amount of the insulating members 10 can not be determined as a general rule. It is therefore preferable to adjust the amount of the insulating members 10 so that the resistance value between the positive electrode 5 and the negative electrode 6 is 1.6 Ω·cm² or more. As a rough guide, it is preferable that the amount of the insulating members 10 is 1 cm$^3$ or more and 2 cm$^3$ or less per 1 m$^2$ of surface area of each of the positive electrode current collector 51 and the negative electrode current collector 61 when the resistance value of the positive electrode mixture layer 52 is small, and 0.3 cm$^3$ or more and 2 cm$^3$ or less per 1 m$^2$ of surface area of each of the positive electrode current collector 51 and the negative electrode current collector 61 when the resistance value of the positive electrode mixture layer 52 is large. For example, when lithium composite oxide containing nickel and cobalt is used as the positive electrode active material, the resistance value of the positive electrode mixture layer 52 is small in many cases. Thus, it is preferable that the amount of the insulating members 10 is 1 cm$^3$ or more and 2 cm$^3$ or less per 1 m$^2$ of surface area of each of the positive electrode current collector 51 and the negative electrode current collector 61. When the amount of the insulating members 10 is smaller than the above-described lower limit, the effect (that a flow of high current between the positive electrode 5 and the negative electrode 6 can be suppressed when the positive electrode 5 and the negative electrode 6 are brought in contact with each other and, as a result, the generation of heat in the lithium ion secondary battery can be prevented) due to the insulating members 10 being provided can not be achieved in many cases. Therefore, it is not preferable that the amount of the insulating members 10 is smaller than the above-described lower limit. On the other hand, when the amount of the insulating members 10 is larger than the above-described upper limit, the effect due to the insulating members 10 being provided can be achieved, but battery performance (discharge performance, a battery capacity, an energy density or the like) is remarkably degraded. Therefore, it is not preferable that the amount of the insulating members 10 is larger than the above-described upper limit.

As for the form of the insulating members 10, the insulating members 10 may be in a particle form, a chain form, a fiber form, a film form and the like. However, it is preferable that the insulating members 10 are in a particle form, a chain form or a fiber form. When an insulation film is used as the insulating members 10, the interface 53 and the interface 63 might be entirely covered by the insulation film to increase resistances of the interface 53 and the interface 63. As a result, the performance of the lithium ion secondary battery is degraded, and thus, it is not preferable to use an insulation film as the insulating members 10. Therefore, even when a particulate insulation material, a chain insulation material or a fibrous insulation material is used as the insulating members 10, the insulating members 10 are preferably provided so as not to entirely cover the interface 53 and the interface 63.

As the particulate insulating members 10, it is more preferable that the insulating members 10 are in a particle form with a particle size of 0.1 μm or more and 10 μm or less, and it is even more preferable that the insulating members 10 are in a particle form with a particle size of 0.2 μm or more and 0.5 μm or less. The shape of particle is not limited to a perfect spherical shape but may be slightly distorted. Moreover, as long as the particle size is 0.1 μm or more and 10 μm or less, particles having different particle sizes may be scattered at the interface 53 and the interface 63.

When the particle size is less than 0.1 μm, it is difficult to control the resistance between the positive electrode 5 and the negative electrode 6, and thus, the insulating members 10 having a smaller particle size than 0.1 μm are not preferable. The reason for this is given below. As the particle size of the insulating members 10 reduces, the degree (coverage) of each of respective surfaces of the positive electrode current collector 51 and the negative electrode current collector 61 covered by the insulating members 10 increases even through an amount of the insulating members 10 is small. However, when the amount of the insulating members 10 is too small, it is difficult to uniformly provide the insulating members 10 at the surfaces of the positive electrode current collector 51 and the negative electrode current collector 61, and thus, the number of particles of the insulating members 10 largely varies. Accordingly, the contact area of the insulating members 10 with the positive electrode current collector 51 and the negative electrode current collector 61 largely varies and, as a result, it becomes difficult to control the resistance between the positive electrode 5 and the negative electrode 6.

On the other hand, when the particle size is larger than 10 μm, depending on respective particle sizes of the active materials, the positive electrode active material and the negative electrode active material enter between adjacent insulating members 10. Thus, on the surfaces of the positive electrode current collector 51, there are the insulating members 10 located adjacent to one another and positive electrode active materials located between adjacent ones of the insulating members 10. In the same manner, on the surface of the negative electrode current collector 61, there are the insulating members 10 located adjacent to one another and negative electrode active materials located between adjacent ones of the insulating members 10. Accordingly, a volume occupied by the insulating members 10 in the positive electrode mixture layer 52 and the negative electrode active material layer 62 is increased and, as a result, the amount of the positive electrode active material in the positive electrode mixture layer 52 and the amount of the negative electrode active material in the negative electrode active material layer 62 are reduced. Accordingly, the energy density of the battery is reduced.

As the chain insulating members 10, it is more preferable that particles with a particle size of 0.1 μm or more and 10 μm or less are arranged in chains. Also, adjacent particles may be bonded with a binder or the like interposed therebetween, and a plurality of particles may be pierced, for example, by a thread-like member. As the fibrous insulating members 10, in addition to literally fibrous members, insulating short fibers tangled with one another may be used.

The insulating members 10, as a resistance element, can preferably maintain its insulation property, even when the porous insulation layer 7 has disappeared at a time of overcharge or due to an internal short-circuit, the temperature of the battery is locally increased to high temperature to cause an electrolyte to catch fire, and, as a result, an inside temperature of the battery reaches high temperature. The insulating members 10 are preferably formed of a material having a resistance value of $10^6$ Ω·cm or more, i.e., specifically, metal oxide, metal nitride, metal sulfide, a heat-stable organic material whose melting point is 200° C. or more, or the like. Among such materials, metal oxide is preferably used as the insulating members 10 because metal oxide can suppress the occurrence of decomposition reaction associated with an exothermic reaction and thus prevent the further generation of heat, and also because metal oxide can stay in a solid state even under high temperature and thus can suppress a spread of fire. As metal oxide, alumina (aluminum oxide), titania (titanium oxide), zirconia (zirconium oxide), magnesia (magnesium oxide), zinc oxide, silica (silicon oxide) or the like can be used.

As a method for providing the above-described insulating members 10 so that the insulating members 10 are scattered on the surface of the positive electrode current collector 51 and the surface of the negative electrode current collector 61, there is a method in which the insulating members 10, a binder and a solvent are first mixed to form a paste, and, next, the paste is applied to the surfaces of the positive electrode current collector 51 and the negative electrode current collector 61 and dried.

In this embodiment, materials for the positive electrode current collector 51, the negative electrode current collector 61, the positive electrode mixture layer 52, the negative electrode active material layer 62, the porous insulation layer 7 and the like are not particularly limited, but known materials can be used. However, as the positive electrode active material in the positive electrode mixture layer 52, it is preferable to use lithium composite oxide containing Co, Ni and M (where M is at least one of Na, Mg, Sc, Y, Mn, Fe, Cu, Zn, Al, Cr, Pb, Sb and B). It is highly likely that such a positive electrode active material is decomposed under high temperature, and a large amount of heat and oxygen are generated when the decomposition reaction takes place. Therefore, when such lithium composite oxide is used as the positive electrode active material, an internal short-circuit occurs with high probability. However, even when such lithium composite oxide is used as the positive electrode active material, the resistance value between the positive electrode 5 and the negative electrode 6 can be made to be $1.6\,\Omega\cdot cm^2$ or more, and preferably $5\,\Omega\cdot cm^2$ or more and $10\,\Omega\cdot cm^2$ or less by scattering the insulating members 10 at the interface between the positive electrode current collector 51 and the positive electrode mixture layer 52. Thus, even when the porous insulation layer 7 has disappeared, a flow of high current between the positive electrode 5 and the negative electrode 6 can be prevented, so that the generation of heat in the lithium ion secondary battery can be prevented.

Examples of the positive electrode active material includes $LiCoO_2$, $LiNiO_2$, $LiMnO_2$, $LiCoNiO_2$, $LiCoMO_Z$, $LiNiMO_Z$, $LiMn_2O_4$, $LiMnMO_4$, $LiMPO_4$ and $Li_2MPO_4F$ (M=at least one of Na, Mg, Sc, Y, Mn, Fe, Co, Ni, Cu, Zn, Al, Cr, Pb, Sb and B). Furthermore, the positive electrode active material may be a material obtained by replacing an element of any one of the above-described lithium-containing compounds with some other element. Also, as the positive electrode active material, a material which has been subjected to surface treatment using metal oxide, lithium oxide, a conductive agent and the like may be used. As surface treatment, hydrophobic treatment may be performed.

As the negative electrode active material, for example, metal, metal fiber, carbon material, oxide, nitride, tin compound, silicon compound, various alloy materials and the like can be used. As the carbon material, a carbon material such as, for example, various types of natural graphites, coke, partially graphitized carbon in the process of graphitization, carbon fiber, spherical carbon, various types of artificial graphite, amorphous carbon, and the like is used. Also, an elemental substance such as silicon (Si), tin (Sn) or the like, a silicon compound, or a tin compound is preferably used as the negative electrode active material because they have large capacity density. For example, as silicon compound, $SiO_x$ ($0.05<x<1.95$), silicon alloy, silicon compound, silicon solid solution, or the like in which part of Si has been replaced with at least one element selected from the group consisting of B, Mg, Ni, Ti, Mo, Co, Ca, Cr, Cu, Fe, Mn, Nb, Ta, V, W, Zn, C, N and Sn can be used. As tin compound, $Ni_2Sn_4$, $Mg_2Sn$, $SnO_x$ ($0<x<2$), $SnO_2$, $SnSiO_3$ or the like can be used. As the negative electrode active material, one of these materials may be independently used or a combination of two or more of these materials may be used.

The positive electrode mixture layer 52 preferably contains, in addition to the above-described lithium composite oxide, a binder and a conductive agent. Also, the negative electrode active material layer 62 preferably contains a binder, in addition to the above-described negative electrode active material.

As the binder, for example, PVDF (poly(vinylidene fluoride)), polytetrafluoroethylene, polyethylene, polypropylene, aramid resin, polyamide, polyimide, polyamide imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyethersulfone, hexafluoropolypropylene, styrene butadiene rubber, carboxymethylcellulose or the like can be used. Also, copolymer including two or more materials selected from the group consisting of tetrafluoroethylene, hexafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid and hexadiene may be used or a mixture of two or more selected from the above-described group may be used.

As the conductive agent, for example, graphites such as natural graphite, artificial graphite and the like, carbon blacks such as acetylene black (AB), ketchen black, channel black, furnace black, lamp black, thermal black and the like, conductive fibers such as carbon fiber, metal fiber and the like, fluorocarbon, metal powders such as aluminum and the like, conductive whiskers such as zinc oxide, potassium titanate and the like, conductive metal oxide such as titanium oxide and the like, and organic conductive materials such as phenylene derivative and the like can be used.

The composition ratio of the active material, the conductive agent and the binder in the positive electrode mixture layer 52 is not particularly limited, but may be a composition ratio used in a known mixture layer. In the same manner, the composition ratio of the active material and the binder in the negative electrode active material layer 62 is not particularly limited but can be any composition ratio used in a known mixture layer.

As each of the positive electrode current collector 51 and the negative electrode current collector 61, a long porous conductive substrate or a nonporous conductive substrate is used. As a material used for the conductive substrate, for example, stainless steel, aluminum, titanium or the like is used for the positive electrode current collector 51. As the negative electrode current collector 61, for example, stainless steel, nickel, copper or the like is used. The thicknesses of each of the positive electrode current collector 51 and the negative electrode current collector 61 is not particularly limited, but is preferably 1 µm or more and 500 µm or less, and is more preferably 5 µm or more and 20 µm or less. When each of the positive electrode current collector 51 and the negative electrode current collector 61 is formed so as to have a thickness in the above-described range, the weight of each of the positive electrode 5 and the negative electrode 6 can be reduced while the strength of each of the positive electrode 5 and the negative electrode 6 is maintained.

The positive electrode 5 is formed by, first mixing a positive electrode mixture (containing a binder and a conductive agent) made of any element and a positive electrode active material in a liquid component to prepare a positive electrode mixture slurry, next applying the prepared positive electrode mixture slurry to surfaces of the positive electrode current collector 51, and drying the applied positive electrode mixture slurry. In the same manner, the negative electrode 6 is formed by, first mixing a negative electrode mixture (containing a binder) made of any element and a negative electrode active material in a liquid component to prepare a negative electrode mixture slurry, next applying the prepared negative electrode mixture slurry to surfaces of the negative electrode current collector 61, and drying the applied negative electrode mixture slurry.

As the binder contained in the paste, for example, PVDF, polytetrafluoroethylene, polyethylene, polypropylene, aramid resin, polyamide, polyimide, polyamide imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyethersulfone, hexafluoropolypropylene, styrene butadiene rubber, carboxymethylcellulose or the like can be used. Also, copolymer including two or more materials selected from the group consisting of tetrafluoroethylene, hexafluoroethylene, hexafluoropropylene, perfluoroalkylvinylether, vinylidene fluoride, ethylene, propylene, pentafluoropropylene, fluoromethylvinylether, acrylic acid and hexadiene may be used or a mixture of two or more selected from the above-described group may be used.

A conductive agent may be contained in the paste. As the conductive agent contained in the paste, for example, graphites such as natural graphite, artificial graphite and the like, carbon blacks such as acetylene black, ketchen black, channel black, furnace black, lamp black, thermal black and the like, conductive fibers such as carbon fiber, metal fiber and the like, fluorocarbon, metal powders such as aluminum and the like, conductive whiskers such as zinc oxide, potassium titanate and the like, conductive metal oxide such as titanium oxide and the like and organic conductive materials such as phenylene derivative and the like can be used.

As the porous insulation layer 7 interposed between the positive electrode 5 and the negative electrode 6, a microporous thin film, woven fabric, nonwoven fabric or the like having a large ion transmittance, a predetermined mechanical strength and insulation property is used. For example, when polyolefin such as polypropylene, polyethylene and the like is used as a material of the porous insulation layer 7, safety of a lithium ion secondary battery can be improved because polyolefin has an excellent durability and the shut down function. It is therefore preferable to use, as the porous insulation layer 7, polyolefin such as polypropylene, polyethylene and the like. The thickness of the porous insulation layer 7 is, in general, 10 μm or more and 300 μm or less, but it is preferably 10 μm or more and 40 μm or less. The thickness of the porous insulation layer 7 is more preferably 15 μm or more and 30 μm or less, and even more preferably 10 μm or more and 25 μm or less. The microporous thin film may be a single layer film formed of a single material or may be a composite film or a multilayer film formed of one or more materials. Moreover, the pore ratio of the porous insulation layer 7 is preferably 30% or more and 70% or less, and more preferably 35% or more and 60% or less. Herein, "pore ratio" means volume ratio of pore potions of the porous insulation layer 7 to the entire volume of the porous insulation layer.

As the nonaqueous electrolyte, a liquid nonaqueous electrolyte, a gel nonaqueous electrolyte, or a solid nonaqueous electrolyte (polymer solid electrolyte) can be used.

A liquid nonaqueous electrolyte can be obtained by dissolving an electrolyte (for example, lithium salt) in a nonaqueous solvent. A gel nonaqueous electrolyte contains a nonaqueous electrolyte and a polymer material for holding the nonaqueous electrolyte. As the polymer material, for example, polyvinylidene fluoride, polyacrylonitrile, polyethylene oxide, polyvinyl chloride, polyacrylate, polyvinylidene fluoride hexafluoropropylene, or the like is preferably used.

As the nonaqueous solvent in which the electrolyte is dissolved, any known nonaqueous solvent can be used. The nonaqueous solvent is not particularly limited to a particular type, but, for example, cyclic carbonic acid ester, chain carbonic acid ester, cyclic carboxylic acid ester or the like can be used. Examples of cyclic carbonic acid ester include propylene carbonate (PC), ethylene carbonate (EC) and the like. Examples of chain carbonic acid include diethyl carbonate (DEC), ethyl methyl carbonate (EMC), dimethyl carbonate (DMC) and the like. Examples of cyclic carboxylic acid ester include γ-butyrolactone (GBL), γ-valerolactone (GVL) and the like. As the nonaqueous solvent, one of these materials may be independently used or a combination of two or more of these materials may be used.

As the electrolyte to be dissolved in the nonaqueous solvent, for example, $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lower aliphatic series lithium carboxylate, LiCl, LiBr, LiI, chloroborane lithium, borate salts, imide salts and the like can be used. Examples of borate salts include bis(1,2-benzenediolate(2-)-O,O') lithium borate, bis(2,3-naphthalenediolate (2-)-O,O') lithium borate, bis(2,2'-biphenyldiolate(2-)O,O') lithium borate, bis(5-fluoro-2-olate-1-benzenesulfonate-O, O') lithium borate and the like. Examples of imide salts include lithium bistrifluoromethanesulfonate imide (($CF_3SO_2$)$_2$NLi), lithium trifluoromethanesulfonate nonafluorobutanesulfonate imide (LiN($CF_3SO_2$)($C_4F_9SO_2$)), lithium bispentafluoroethanesulfonate imide (($C_2F_5SO_2$)$_2$NLi) and the like. As the electrolyte, one of these materials may be independently used or a combination of two or more of these materials may be used.

The nonaqueous electrolyte may contain, as an additive, a material which is decomposed on the negative electrode 6 to form a coating film having a high lithium ion conductivity and increases a coulombic efficiency of a battery. Examples of the additive having the above-described function include vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenilvinylene carbonate, vinylethylene carbonate (VEC), divinylethylene carbonate and the like. As the additive, one of these compounds may be independently used or a combination of two or more of these compounds may be used. Among the above-described additives, at least one additive selected from the group consisting of vinylene carbonate, vinylethylene carbonate and divinylethylene carbonate is preferably used. Note that some of hydrogen atoms in each of the above-described compounds may be replaced with fluorine atoms. An amount of the electrolyte to be dissolved with respect to the nonaqueous solvent is preferably 0.5 mol/m$^3$ or more and 2 mol/m$^3$ or less.

Furthermore, the nonaqueous electrolyte may contain a known benzene derivative which is decomposed at a time of overcharge to form a coating film on an electrode plate and deactivates the battery. As the benzene derivative, a benzene derivative including a phenyl group or a benzene derivative including a cyclic compound group adjacent to a phenyl group is preferable. Examples of the cyclic compound group include a phenyl group, a cyclic ether group, a cyclic ester group, a cycloalkyl group, a phenoxy group and the like. Specific examples of the benzene derivative include cyclohexyl benzene, biphenyl, diphenyl ether and the like. As the benzene derivative, one of these materials may be independently used or a combination of two or more of these materials may be used. Note that a content of the benzene derivative in the nonaqueous solvent is preferably 10 vol % or less of the entire nonaqueous solvent.

Note that the lithium ion secondary battery of this embodiment may have the following configuration.

The configuration of the lithium ion secondary battery is not limited to the shape of FIG. 1. Specifically, the lithium ion secondary battery may have a rectangular cylindrical shape, and also have a configuration which allows current collection without a current passing though a tab. Moreover, in FIG. 1, the positive electrode and the negative electrode are spirally wound with the porous insulation layer interposed therebetween, but the positive electrode and the negative electrode may be stacked with the porous insulation layer interposed therebetween.

According to this embodiment, the insulating members are scattered at the interface between the positive electrode current collector and the positive electrode mixture layer and the interface between the negative electrode current collector and the negative electrode active material layer. However, the insulating members may be scattered at one of the interfaces. The insulating members may be scattered either at one of the interfaces or both of the interfaces, if, by doing so, the resistance value between the positive electrode and the negative electrode can be made to be 1.6 $\Omega \cdot cm^2$ or more.

The positive electrode current collector, the negative electrode current collector, the positive electrode active material, the negative electrode active material, the conductive agent, the binder, the solvent of the nonaqueous electrolyte, the solute of the nonaqueous electrolyte, the material of the porous insulation layer, the thicknesses of the positive electrode current collector, the negative electrode current collector and the porous insulation layer, the composite ratio in each of the positive electrode mixture layer and the negative electrode active material are not limited to those in the description above. In this embodiment, as long as the resistance value between the positive electrode and the negative electrode is 1.6 $\Omega \cdot cm^2$ or more, the materials of the above-described components and the like are not limited.

EXAMPLES

Example 1

In Example 1, 8 types (Batteries 1 through 8) of lithium ion secondary batteries having different resistance values between the positive electrode and the negative electrode were produced, and safety evaluation test was performed to the lithium ion secondary batteries.
1. Method for producing Batteries 1 through 8
(Battery 1)

Using $LiNi_{0.80}Co_{0.15}Al_{0.05}O_2$ as the positive electrode active material, Battery 1 in which a resistance value between the positive electrode and the negative electrode was 1.6 $\Omega \cdot cm^2$ was formed. Hereinafter, the method for producing Battery 1 will be described.
(Production of Positive Electrode)

First, 4 parts by weight of polyacrylic acid derivative (binder) and a proper amount of N-methyl-2-pyrrolidone (hereinafter, referred to as "NMP") (dispersion medium) were mixed with 100 parts by weight of polycrystalline alumina particles (insulating members) having an average particle size of 0.3 thereby preparing a slurry having a nonvolatile content of 30 wt %. In this case, using a disperser "CLEARMIX (product name)" produced by M technique Co., Ltd., a mixture of the polycrystalline alumina particles, the binder and the dispersion medium was agitated to disperse the polycrystalline alumina particles, and the binder in the NMP until they were uniformly dispersed.

Next, using a gravure roll, the slurry was applied to both surfaces of an aluminum foil (positive electrode current collector) having a thickness of 15 μm and was dried at 120° C., so that alumina particles were scattered on the surfaces of the positive electrode current collector. Note that an amount of alumina particles scattered on the surfaces of the positive electrode current collector was 1 $cm^3$ per 1 $m^2$ of surface area of the positive electrode current collector.

Subsequently, a solution obtained by dissolving 1.7 parts by weight of polyvinylidene fluoride (PVDF) (binder) in a solvent of N-methylpyrrolidone (NMP) and 1.25 parts by weight of acetylene black were mixed, thereby forming a conductive agent. Thereafter, the conductive agent was mixed with 100 parts by weight of $LiNi_{0.80}Co_{0.15}Al_{0.05}O_2$ (positive electrode active material), thereby obtaining a paste containing a positive electrode mixture. The paste was applied to both surfaces of an aluminum foil having a thickness of 15 μm and, after the paste was dried, the aluminum foil with the paste applied thereto was rolled and cut into pieces having a thickness of 0.125 mm, a width of 57 mm and a length of 667 mm, thereby obtaining a positive electrode.
(Production of Negative Electrode)

First, 100 parts by weight of scale-like artificial graphite was pulverized and classified to obtain particles with an average particle size of about 20 μm.

Next, 3 parts by weight of styrene butadiene rubber as a binder and 100 parts by weight of an aqueous solution containing 1 wt % of carboxymethylcellulose were added to scale-like artificial graphite and then mixed, thereby obtaining a paste containing a negative electrode mixture. Thereafter, the paste was applied to both surfaces of a copper foil (negative electrode current collector) having a thickness of 8 μm and, after the paste was dried, the copper foil with the paste applied thereto was rolled and cut into pieces having a thickness of 0.156 mm, a width of 58.5 mm and a length of 750 mm, thereby obtaining a negative electrode.
(Preparation of Nonaqueous Electrolyte)

To a mixture solvent containing ethylene carbonate and dimethyl carbonate at a volume ratio of 1:3, 5 wt % of vinylene carbonate was added, and $LiPF_6$ was dissolved therein with a concentration of 1.4 $mol/m^3$, thereby obtaining a nonaqueous electrolyte.
(Formation of Cylindrical Battery)

First, a positive electrode lead made of aluminum was attached to the positive electrode current collector, and a negative electrode lead made of nickel was attached to the negative electrode current collector. Thereafter, the positive electrode and the negative electrode were wound with a porous insulation layer interposed between the positive electrode and the negative electrode to form an electrode group.

Next, insulation plates were arranged on and under the electrode group, respectively, the negative electrode lead was welded to the battery case, and the positive electrode lead was welded to a sealing plate having an inner pressure actuated safety valve. Then, the electrode group was placed in a battery case.

Thereafter, the nonaqueous electrolyte was injected into the battery case by a decompression process. Finally, an opening end portion of the battery case was crimped to the sealing plate with a gasket interposed therebetween to complete a battery. A battery capacity of the obtained battery was 2.8 Ah (note that a capacity of $LiNi_{0.80}Co_{0.15}Al_{0.05}O_2$ was 191 mAh/g). In this case, the battery capacity means a capacity obtained when the battery was charged with a constant current of 1.4 A until a battery voltage reached 4.2 V in an environment of 25°

C., the battery was charged with a constant voltage of 4.2 V until a current value reached 50 mA, and then the battery was discharged with a constant current value of 0.56 A until the battery voltage reached 2.5 V.

(Battery 2)

Except that $LiCoO_2$ was used as the positive electrode active material, Battery 2 was produced in the same manner as Battery 1. A battery capacity of Battery 2 was 2.1 Ah (note that a capacity of $LiCoO_2$ was 151 mAh/g).

(Battery 3)

Except that $LiNi_{0.33}Mn_{0.33}Co_{0.33}O_2$ was used as the positive electrode active material, Battery 3 was produced in the same manner as Battery 1. A battery capacity of Battery 3 was 2.2 Ah (note that a capacity of $LiNi_{0.33}Mn_{0.33}Co_{0.33}O_2$ was 151 mAh/g).

(Battery 4)

Except that the amount of alumina particles scattered on each surface of the current collector was 1.5 $cm^3$ per 1 $m^2$ of surface area of the surface of the current collector, Battery 4 was produced in the same manner as Battery 1. A battery capacity of Battery 4 was 2.78 Ah.

(Battery 5)

Except that the amount of alumina particles scattered on each surface of the current collector was 2.0 $cm^3$ per 1 $m^2$ of surface area of the surface of the current collector, Battery 5 was produced in the same manner as Battery 1. A battery capacity of Battery 5 was 2.75 Ah.

(Battery 6)

Except that alumina particles were not scattered at an interface between the current collector and the mixture layer, Battery 6 was produced in the same manner as Battery 1. A battery capacity of Battery 6 was 2.82 Ah.

(Battery 7)

Except that alumina particles were not scattered at an interface between the current collector and the mixture layer, Battery 7 was produced in the same manner as Battery 2. A battery capacity of Battery 7 was 2.12 Ah.

(Battery 8)

Except that alumina particles were not scattered at an interface between the current collector and the mixture layer, Battery 8 was produced in the same manner as Battery 3. A battery capacity of Battery 8 was 2.22 Ah.

2. Evaluation Method (Evaluation of Resistance Between Positive Electrode Current Collector and Negative Electrode Current Collector)

For Battery 1 obtained in the above-described manner, the resistance between the positive electrode and the negative electrode was measured.

First, Battery 1 was charged. Specifically, each battery was charged with a constant current by flowing a current of 1.45 A until a voltage reached 4.2 V and, after the voltage reached 4.2 V, the battery was charged with a constant voltage until a current reached 50 mA.

Next, Battery 1 was decomposed and the porous insulation layer and the like were removed. Specifically, the positive electrode plate and the negative electrode plate were taken out, EC and the electrolyte were removed using dimethyl carbonate, and then the positive electrode plate and the negative electrode plate were vacuum dried at normal temperature.

Subsequently, the resistance value between the positive electrode and the negative electrode was measured. Specifically, a 2.5 cm×2.5 cm surface of the mixture layer of the positive electrode was brought in contact with a 2.5 cm×2.5 cm surface of the mixture layer of the negative electrode. Thereafter, a humidity was set to be 20% or less, an ambient temperature was set to be 20° C., a voltage at a time when a current was flowed between the positive electrode current collector and the negative electrode current collector was measured using a four terminal method with a pressure of $9.8 \times 10^5$ $N/m^2$ applied, and then a direct resistance was calculated. In the same manner, the resistance between the positive electrode and the negative electrode was measured for Batteries 2 through 8.

(Safety Evaluation)

For Battery 1 obtained in the above-described manner, safety evaluation was performed using nail test.

First, Battery 1 was charged. Specifically, each battery was charged with a constant current of 1.45 A until a voltage reached 4.25 V and, after the voltage reached 4.25 V, the battery was charged with a constant voltage until a current reached 50 mA.

Thereafter, in environments of 30° C., 45° C., 60° C. and 75° C., a nail of 2.7 φ was stuck in a center portion of each battery so as to penetrate through the battery, and then change in appearance of the battery was checked. In environments of 30° C., 45° C. and 60° C., a nail was stuck at a speed of 5 mm/s. In an environment of 75° C., a nail was stuck at a speed of 150 m/s. Also, whether smoke was emitted from the battery was evaluated. In the same manner, safety evaluation was performed to Batteries 2 through 8.

3. Results and Discussion

Obtained results are shown in Table 1. In Table 1, an AB amount is an AB amount in the positive electrode, and the unit thereof is %. The unit of particle size of insulating members is μm, the unit of amount of the insulating members is $cm^3/m^2$, and the unit of resistance value is $\Omega \cdot cm^2$. A capacity is a battery capacity, and the unit thereof is Ah. For results of nail test, a denominator is a population parameter for expressing the number of tests performed, and a numerator is the number of batteries from which smoke was emitted.

TABLE 1

| | Positive electrode active material | AB amount | Insulating members | | | Resistance value | Capacity | Nail test | | | |
|---|---|---|---|---|---|---|---|---|---|---|---|
| | | | Material | Particle size | Amount | | | 30° C. | 45° C. | 60° C. | 75° C. |
| Battery 1 | $LiNiCoAlO_2$ | 1.25 | Particle alumina | 0.3 | 1 | 1.6 | 2.80 | 0/5 | 0/5 | 0/5 | 1/5 |
| Battery 2 | $LiCoO_2$ | 1.25 | Particle alumina | 0.3 | 1 | 1.7 | 2.10 | 0/5 | 0/5 | 0/5 | 1/5 |
| Battery 3 | $LiNiMnCoO_2$ | 1.25 | Particle alumina | 0.3 | 1 | 2 | 2.20 | 0/5 | 0/5 | 0/5 | 0/5 |
| Battery 4 | $LiNiCoAlO_2$ | 1.25 | Particle alumina | 0.3 | 1.5 | 5 | 2.78 | 0/5 | 0/5 | 0/5 | 0/5 |

TABLE 1-continued

| | Positive electrode active material | AB amount | Insulating members | | | Resistance value | Capacity | Nail test | | | |
|---|---|---|---|---|---|---|---|---|---|---|---|
| | | | Material | Particle size | Amount | | | 30° C. | 45° C. | 60° C. | 75° C. |
| Battery 5 | LiNiCoAlO$_2$ | 1.25 | Particle alumina | 0.3 | 2 | 10 | 2.75 | 0/5 | 0/5 | 0/5 | 0/5 |
| Battery 6 | LiNiCoAlO$_2$ | 1.25 | Not provided | Not provided | Not provided | 0.1 | 2.82 | 0/5 | 5/5 | 5/5 | 4/5 |
| Battery 7 | LiCoO$_2$ | 1.25 | Not provided | Not provided | Not provided | 0.2 | 2.12 | 0/5 | 5/5 | 5/5 | 3/5 |
| Battery 8 | LiNiMnCoO$_2$ | 1.25 | Not provided | Not provided | Not provided | 0.5 | 2.22 | 0/5 | 5/5 | 5/5 | 2/5 |

As shown in Table 1, the resistance value between the positive electrode and the negative electrode was 1.6 Ω·cm$^2$ or more in Batteries 1 through 5, but was 0.5 Ω·cm$^2$ or less in Batteries 6 through 8. This shows that, when the insulating members were scattered on surfaces of the positive electrode current collector, the resistance between the positive electrode and the negative electrode was increased. Also, in Battery 1, Battery 4 and Battery 5, as the amount of the insulating members increased, the resistance between the positive electrode and the negative electrode increased.

For the battery capacity, when the same positive electrode active material was used, the batteries in which the insulating members were not provided exhibited slightly larger values. Specifically, comparing Battery 1 and Battery 6, the battery capacity of Battery 6 is slightly larger. Comparing Battery 2 and Battery 7, the battery capacity of Battery 7 is slightly larger. And, comparing Battery 3 and Battery 8, the battery capacity of Battery 8 is slightly larger. Moreover, the battery capacity differs among Batteries 1 through 3. The reason for this is presumably that an availability of the positive electrode active material differs. Furthermore, Battery 5 exhibited the largest amount of the insulating members, but a practical battery capacity value was exhibited even for the battery capacity of Battery 5.

As for nail test, the results show that emission of smoke was suppressed in Batteries 1 through 5, compared to Batteries 6 through 8. Herein, emission of smoke means that an explosion proof valve of a battery was operated and smoke from within the battery was observed. Based on the results, it is understood that in Batteries 6 through 8, when the porous insulation layer has disappeared, a high current flows between the positive electrode and the negative electrode, but in Batteries 1 through 5, even when the porous insulation layer has disappeared, a high current does not flow between the positive electrode and the negative electrode.

Furthermore, for Batteries 4 and 5, the number of batteries in which emission of smoke occurred was reduced, compared to Batteries 1 through 3. Specifically, for Battery 5, the number of batteries in which emission of smoke occurred was 0 even in an environment of 75° C. Based on the results, it is understood that as the amount of the insulating members increases, a flow of high current between the positive electrode and the negative electrode can be prevented more effectively.

Example 2

In Example 2, locations where alumina particles were scattered were optimized.

In this example, except that alumina particles were mixed in the positive electrode mixture layer, Battery 9 was produced in the same manner as Battery 5. Then, the battery capacity and the resistance value between the positive electrode and the negative electrode were measured for Battery 9, according to the measuring method of Example 1. Obtained results are shown in Table 2. In Table 2, the unit of resistance value is Ω·cm$^2$, and the unit of battery capacity is Ah.

TABLE 2

| | Resistance | Battery capacity |
|---|---|---|
| Battery 5 | 10 | 2.75 |
| Battery 9 | 0.1 | 2.75 |

As shown in Table 2, the battery capacity was 2.75 Ah for both of Battery 5 and Battery 9. However, the resistance between the positive electrode and the negative electrode was 10 Ω·cm$^2$ for Battery 5 and 0.1 Ω·cm$^2$ for Battery 9. Based on the above, it is understood that, although Battery 5 and Battery 9 exhibited the same battery performance of lithium ion secondary battery, a flow of high current between the positive electrode and the negative electrode can be prevented in Battery 5 even when the porous insulation layer has disappeared, but in Battery 9, a flow of high current between the positive electrode and the negative electrode can not be prevented when the porous insulation layer has disappeared, and thus, safety of lithium ion secondary battery is reduced.

Example 3

In Example 3, the insulating members were optimized.

Specifically, in this example, except for the insulating members, Batteries 10 through 20 were prepared in the same manner as Battery 4. In Batteries 10 through 17, alumina particles were used as the insulating members. As shown in Table 3, respective particle sizes of alumina particles in Batteries 10 through 17 were 0.05 μm, 0.09 μm, 0.1 μm, 1 μm, 5 μm, 10 μm, 11 μm and 20 μm in the corresponding order. In Battery 18, as the insulating members, alumina chain, i.e., calcined α-alumina (ceramic precursor) obtained by burning dried gel at 1200° C. for 3 hours and having a nucleus of α-alumina single crystal with an average particle size of about 0.2 μm were used. In Battery 19, as the insulating members, alumina fiber having a fiber diameter of 2 μm and a fiber length of 40 μm was used. In Battery 20, as the insulating members, a resistive layer formed of acetylene black and polyethylene and having a resistance value of 0.1 Ω·cm² was used. Then, the resistance value and the battery capacity were measured for the batteries according to the method in Example 1, and nail test was performed to the batteries. Obtained results are shown in Table 3.

In Table 3, the unit of resistance value is Ω·cm², and the unit of battery capacity is Ah. For results of nail test, a denominator is a population parameter for expressing the number of tests performed, and a numerator is the number of batteries from which smoke was emitted.

TABLE 3

|  | Insulating members | Resistance value | Battery capacity | Nail test 30° C. | 45° C. | 60° C. | 75° C. |
|---|---|---|---|---|---|---|---|
| Battery 10 | Particle (0.05 μm) | 30 | 2 | 0/5 | 1/5 | 1/5 | 2/5 |
| Battery 11 | Particle (0.09 μm) | 15 | 2.76 | 0/5 | 1/5 | 1/5 | 1/5 |
| Battery 12 | Particle (0.1 μm) | 10 | 2.78 | 0/5 | 0/5 | 0/5 | 1/5 |
| Battery 4 | Particle (0.3 μm) | 5 | 2.78 | 0/5 | 0/5 | 0/5 | 0/5 |
| Battery 13 | Particle (1 μm) | 3.2 | 2.78 | 0/5 | 0/5 | 0/5 | 0/5 |
| Battery 14 | Particle (5 μm) | 2.3 | 2.78 | 0/5 | 0/5 | 0/5 | 0/5 |
| Battery 15 | Particle (10 μm) | 1.7 | 2.78 | 0/5 | 0/5 | 0/5 | 1/5 |
| Battery 16 | Particle (11 μm) | 1.3 | 2.78 | 0/5 | 0/5 | 1/5 | 3/5 |
| Battery 17 | Particle (20 μm) | 0.3 | 2.78 | 0/5 | 5/5 | 5/5 | 5/5 |
| Battery 18 | Chain | 2.5 | 2.78 | 0/5 | 0/5 | 0/5 | 1/5 |
| Battery 19 | Fiber | 1.9 | 2.78 | 0/5 | 0/5 | 0/5 | 0/5 |
| Battery 20 | Resistive layer | 0.2 | 2.78 | 0/5 | 5/5 | 5/5 | 5/5 |

For Battery 10 and Battery 11, batteries in which heat generation occurred at low temperature were observed.

For Battery 16, Battery 17 and Battery 20, the resistance value between the positive electrode and the negative electrode was small and, as a result, reduction in safety of lithium ion secondary battery was confirmed.

In contrast, for Battery 4, Batteries 12 through 15, Battery 18, and Battery 19, the battery capacity, the resistance value between the positive electrode and the negative electrode, and safety evaluation were all preferable.

Based on the above, it is understood that, as long as alumina particles having a particle size of 0.1 μm or more and 10 μm or less, alumina chains of alumina particles, or alumina fibers were used as the insulating members, reduction in performance of secondary battery can be suppressed even when the insulating members are provided, a flow of high current between the positive electrode and the negative electrode can be suppressed even when the porous insulation layer has disappeared, and furthermore, high volume production of a lithium ion secondary battery is possible.

Example 4

In Example 4, the amount of alumina particles was optimized.

In this example, except for the amount of alumina particles, Batteries 21 through 25 were prepared in the same manner as Battery 1. The amounts of alumina particles in Batteries 21 through 25 were as shown in Table 4. The battery capacity and the resistance value between the positive electrode and the negative electrode were measured for Batteries 21 through 25 according to the measuring method of Example 1, and safety evaluation was performed for the batteries. Obtained results are shown in Table 4.

In Table 4, an amount provided is an amount of provided alumina, and the unit thereof is cm³/m². The unit of resistance value is Ω·cm², and the unit of battery capacity is Ah. For results of nail test, a denominator is a population parameter for expressing the number of tests performed, and a numerator is the number of batteries from which smoke was emitted.

TABLE 4

|  | Amount provided | Resistance value | Battery capacity | Nail test 30° C. | 45° C. | 60° C. | 75° C. |
|---|---|---|---|---|---|---|---|
| Battery 21 | 0.5 | 0.3 | 2.8 | 0/5 | 5/5 | 5/5 | 2/5 |
| Battery 22 | 0.8 | 0.7 | 2.8 | 0/5 | 0/5 | 4/5 | 2/5 |
| Battery 1 | 1.0 | 1.6 | 2.8 | 0/5 | 0/5 | 0/5 | 1/5 |
| Battery 4 | 1.5 | 5 | 2.78 | 0/5 | 0/5 | 0/5 | 0/5 |
| Battery 23 | 2.0 | 10 | 2.75 | 0/5 | 0/5 | 0/5 | 0/5 |
| Battery 24 | 2.2 | 15 | 2.62 | 0/5 | 0/5 | 0/5 | 0/5 |
| Battery 25 | 3.0 | 30 | 2.0 | 0/5 | 0/5 | 0/5 | 0/5 |

As shown in Table 4, for Battery 21 and Battery 22, although reduction in battery capacity caused by providing alumina particles was suppressed, the resistance value between the positive electrode and the negative electrode was small, and the result for safety valuation was not good.

For Batteries 24 and 25, the resistance value between the positive electrode and the negative electrode was increased, and the result of safety evaluation was good. However, reduction in battery capacity caused by providing alumina particles was not suppressed. Specifically, reduction in battery capacity in Battery 27 was remarkable.

In contrast, for Battery 1, Battery 4 and Battery 23, the result of safety evaluation was good, and reduction in battery capacity caused by providing alumina particles was also suppressed. Based on the above, presumably, when $LiNi_{0.80}Co_{0.15}Al_{0.05}O_2$ is used as the positive electrode active material, it is preferable that the amount of alumina particles is 1 cm$^3$/m$^2$ or more and 2 cm$^3$/m$^2$ or less.

Example 5

In Example 5, effects depending on differences in material of the positive electrode active material in the positive electrode mixture layer were confirmed.

Specifically, in this example, except for the type and mixture ratio of the positive electrode active material in the positive electrode mixture layer, Batteries 26 through 31 were prepared in the same manner as Battery 1.

For Batteries 26 through 28, $LiNi_{0.80}Co_{0.15}Al_{0.05}O_2$ and $LiMnO_4$ were used as the positive electrode active material, and the mixture ratio thereof was as shown in Table 5.

Also, for comparison purpose, Batteries 29 through 31 were prepared in the same manner as Batteries 26 through 28, respectively, except that alumina was not scattered at surfaces of the positive electrode current collector. The compositions of the positive electrode active material for Batteries 29 through 31 were as shown in Table 5.

Then, the battery capacity and the resistance value between the positive electrode and the negative electrode were measured for Batteries 26 through 31 in the same manner as Example 1, and safety evaluation was performed for the batteries. Obtained results are shown in Table 5.

In table 5, the unit of content of each of $LiNi_{0.80}Co_{0.15}Al_{0.05}O_2$ and $LiMnO_4$ is wt %, the unit of resistance value is Ω·cm$^2$, and the unit of battery capacity is Ah. For results of nail test, a denominator is a population parameter for expressing the number of tests performed, and a numerator is the number of batteries from which smoke was emitted.

than 96%, the resistance value between the positive electrode and the negative electrode was not increased unless alumina was scattered on surfaces of the positive electrode current collector. Therefore, in the batteries having a smaller $LiMn_2O_4$ content than 96%, large effects were achieved by scattering the insulating members at an interface between the current collector and the mixture layer.

INDUSTRIAL APPLICABILITY

As has been described, the present invention is useful for, for example, vehicle mounted power sources, power sources for large-size tools, and the like.

The invention claimed is:

1. A nonaqueous electrolyte secondary battery comprising:
a positive electrode including a conductive positive electrode current collector and a positive electrode mixture layer provided on a surface of the positive electrode current collector and containing a positive electrode active material being capable of electrochemically inserting and extracting lithium ions;
a negative electrode including a conductive negative electrode current collector and a negative electrode active material layer provided on a surface of the negative electrode current collector and containing a negative electrode active material being capable of electrochemically inserting and extracting lithium ions;
a porous insulation layer interposed between the positive electrode and the negative electrode;
insulating members are scattered at least one of an interface between the positive electrode current collector and the positive electrode mixture layer and an interface between the negative electrode current collector and the negative electrode active material layer; and
a nonaqueous electrolyte held between the positive electrode and the negative electrode, wherein:
a material of the insulating members is different from components constituting the positive electrode mixture layer and the negative electrode mixture layer, and
an interfacial resistance between the positive electrode including the positive electrode mixture layer and the negative electrode including the negative electrode mixture layer is 1.6 Ω·cm$^2$ or more and 10 Ω·cm$^2$ or less.

2. The nonaqueous electrolyte secondary battery of claim 1, wherein 5 wt % or more of lithium composite oxide

TABLE 5

| | Content | | Insulating | Resistance | Battery | Nail test | | | |
|---|---|---|---|---|---|---|---|---|---|
| | LiNiCoAlO | LiMnO | members | value | capacity | 30° C. | 45° C. | 60° C. | 75° C. |
| Battery 26 | 4 | 96 | Provided | 2.5 | 1.72 | 0/5 | 0/5 | 0/5 | 1/5 |
| Battery 27 | 5 | 95 | Provided | 2.0 | 1.73 | 0/5 | 0/5 | 0/5 | 1/5 |
| Battery 28 | 50 | 50 | Provided | 1.7 | 2.24 | 0/5 | 0/5 | 0/5 | 2/5 |
| Battery 29 | 4 | 96 | Not provided | 1.4 | 1.73 | 0/5 | 0/5 | 1/5 | 0/5 |
| Battery 30 | 5 | 95 | Not provided | 0.6 | 1.74 | 0/5 | 4/5 | 5/5 | 2/5 |
| Battery 31 | 50 | 50 | Not provided | 0.2 | 2.26 | 0/5 | 5/5 | 5/5 | 4/5 |

As shown Table 5, in the batteries such as Battery 26 and Battery 29 having a $LiMn_2O_4$ content of 96% or more, because $LiMn_2O_4$ has a high resistance, the resistance value between the positive electrode and the negative electrode was large even without alumina scattered on surfaces of the positive electrode current collector, and therefore, the lithium ion secondary battery exhibited excellent safety.

In contrast, for batteries such as Battery 27, Battery 28, Battery 30 and Battery 31 having a smaller $LiMn_2O_4$ content containing Co, Ni and some other element M than Co and Ni is contained as the positive electrode active material in the positive electrode mixture layer, and
the element M is at least one of Na, Mg, Sc, Y, Mn, Fe, Cu, Zn, Al, Cr, Pb, Sb and B.

3. The nonaqueous electrolyte secondary battery of claim 1, wherein the insulating members are of at least one of a particulate member having a particle size of 0.1 μm or more and 10 μm or less, a chain member formed of multiple ones of the particulate member arranged in chains, and a fibrous member.

4. The nonaqueous electrolyte secondary battery of claim 1, wherein the insulating members are metal oxide.

* * * * *